United States Patent
Leccia

(10) Patent No.: US 6,445,570 B1
(45) Date of Patent: Sep. 3, 2002

(54) AUTOMATICALLY OPERATING INTERLOCK ASSEMBLY REQUIRING AN ELECTRICAL CABINET TO BE CLOSED BEFORE CONNECTION OF THE EQUIPMENT

(75) Inventor: Brad R. Leccia, Bethel Park, PA (US)

(73) Assignee: Eaton Corporation, Cleveland, OH (US)

( * ) Notice: Subject to any disclaimer, the term of this patent is extended or adjusted under 35 U.S.C. 154(b) by 3 days.

(21) Appl. No.: 09/772,826

(22) Filed: Jan. 30, 2001

(51) Int. Cl.[7] .............................................. H02B 11/00
(52) U.S. Cl. ...................... 361/605; 361/606; 361/609; 174/51; 200/50 A; 200/50 R; 200/50 AA
(58) Field of Search ................................ 361/600–623, 361/626, 835–837; 171/51; 200/50 A, 50 R, 50 AA, 50.01, 50.12–50.19, 50.21–50.25; 335/185–195; 337/6, 7, 168, 186, 211, 212

(56) References Cited

U.S. PATENT DOCUMENTS

| | | | | |
|---|---|---|---|---|
| 3,578,925 A | * | 5/1971 | Drown et al. ................. | 200/50 |
| 3,770,917 A | * | 11/1973 | Tjebben .................... | 200/50 A |
| 3,783,209 A | * | 1/1974 | Cleaveland et al. ...... | 200/50 A |
| 5,450,280 A | * | 9/1995 | Wactor ....................... | 361/606 |
| 5,757,260 A | | 5/1998 | Smith et al. | |
| 5,905,244 A | | 5/1999 | Smith et al. | |
| 5,912,444 A | * | 6/1999 | Godesa .................... | 200/50.01 |
| 6,066,814 A | | 5/2000 | Smith et al. | |

* cited by examiner

Primary Examiner—Darren Schuberg
Assistant Examiner—Michael Datskovsky
(74) Attorney, Agent, or Firm—Martin J. Moran

(57) ABSTRACT

An automatically operating interlock device prevents connection of an electrical device within a cabinet unless the cabinet door is closed. The interlock is particularly useful for circuit breakers contained within arc resistant cabinets. The interlock includes a spring-biased brake bar controlling the position of a brake. The brake bar is biased so that it pulls the brake against one of the wheels of the circuit breaker, thereby preventing movement of the circuit breaker towards its rear, connected position. Closing the door causes the door to push against the brake bar, thereby causing the brake bar to pivot the brake away from the wheel. The circuit breaker may then be moved rearward towards this connected position.

20 Claims, 10 Drawing Sheets

AUTOMATICALLY OPERATING INTERLOCK ASSEMBLY REQUIRING AN ELECTRICAL CABINET TO BE CLOSED BEFORE CONNECTION OF THE EQUIPMENT

BACKGROUND OF THE INVENTION

1. Field of the Invention

This invention relates to automatic lockout mechanisms for electrical equipment containers. More specifically, the invention relates to a system for preventing connection of electrical equipment within a cabinet unless the cabinet door is closed.

2. Description of the Related Art

Electrical equipment such as circuit breakers is typically housed within containers designed to prohibit access to the equipment at times when servicing the equipment would be unsafe. A circuit breaker for medium voltage applications will typically include male and female connectors for disconnecting the circuit breaker from the circuit prior to opening the circuit breaker's container. Additionally, it is generally considered desirable to house such circuit breakers within an arc resistant container. To qualify as arc resistant, the door of the circuit breaker must be closed before the circuit breaker can be connected.

One example of a system for preventing access to a fuse box while the fuses are connected to the circuit is described in U.S. Pat. No. 5,757,260, issued to J. E. Smith et al. on May 26, 1998. This patent describes a pivoting rod blocking rotation of the door's handle when the box containing the fuses is not fully retracted from the circuit. When the box if fully retracted, a pin on the carriage roller engages a camming surface on the rod, disengaging the rod from the door handle mechanism and permitting the door to be opened. Additionally, a slider prevents access to the threaded rod of the levering in mechanism when the door's handle is rotated away from the locked position, thereby securing the carriage in the retracted position. An interlock acting on the carriage itself, instead of the levering in mechanism, may exhibit greater reliability.

Therefore, there is a need for an automatically operating interlock for electrical cabinets wherein the lockout mechanism is controlled by the position of the door itself instead of the door handle. Additionally, there is a need for an interlock mechanism that is simpler, easier to manufacture, and more reliable than presently available interlock systems.

SUMMARY OF THE INVENTION

The present invention is an automatically operating interlock for electrical cabinets, such as arc resistant circuit breaker cabinets. The interlock prevents connecting the circuit breaker or other electrical equipment within the cabinet unless the cabinet door is closed.

A typical circuit breaker for medium voltage applications is mounted on a carriage that is movable between a forward, disengaged position and a rearward, engaged position within the cabinet containing the circuit breaker. At least one pair of quick disconnects terminating in finger clusters protrudes from the rear of the circuit breaker, being dimensioned and configured to engage a pair of stabs at the rear of the circuit breaker's cabinet when the circuit breaker is in the rearward position, thereby connecting the circuit breaker to the protected circuit. A typical medium voltage circuit breaker will use three pairs of mating stab/quick disconnect combinations. When the circuit breaker is moved to its forward position, the finger clusters are withdrawn from the quick disconnects, thereby disconnecting the circuit breaker from the circuit.

Moving the circuit breaker from one position to the other is accomplished by means of a threaded rod extending from the front to the rear of the cabinet. A levering in block engages the threaded rod so that rotation of the threaded rod pushes the levering in block either forward or rearward. The levering in block is secured to the carriage, so that rotation of the threaded rod thereby moves the carriage forward or backward. This process is known as levering in.

The interlock includes a spring-biased brake bar controlling the position of a pivotally mounted brake. The brake bar extends from the cabinet door to a position adjacent one of the wheels of the circuit breaker when the circuit breaker is in its forward, disconnected position. The rear end of the brake bar is pivotally secured to the brake. The brake is in turn pivotally secured to the cabinet floor, also adjacent to the circuit breaker's wheel when the circuit breaker is in the forward position. The brake bar is biased to pull the brake against the wheel, thereby preventing movement of the circuit breaker. The front end of the brake bar is dimensioned and configured to abut the cabinet door when the door is closed. Closing the cabinet door pushes the brake bar rearward, thereby rotating the brake away from the wheel. The circuit breaker may then be moved from its forward, disconnected position to the rearward, connected position using the normal levering in procedure.

It is therefore an aspect of the present invention to provide an automatically operating interlock for electrical cabinets, preventing equipment within the cabinet from moving from a forward, disconnected position to a rearward, connected position unless the cabinet door is closed.

It is another aspect of the present invention to provide an automatically operating interlock for electrical cabinets that is actuated by the position of the cabinet door.

It is a further aspect of the present invention to provide an automatically operating interlock locking the rotation of the rollers for the equipment within the cabinet unless the cabinet door is closed.

It is another aspect of the present invention to provide a brake that is biased towards the rollers of electrical equipment within a cabinet unless the cabinet door is closed.

It is another aspect of the present invention to provide an automatically operating interlock mechanism for electrical cabinets including a spring biased brake bar controlled by the position of the cabinet door, and controlling the position of a brake.

It is a further aspect of the present invention to provide an automatically operating interlock that is simpler, more reliable, and easier to manufacture than other interlocks.

These and other aspects of the present invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The invention is an automatically operating interlock for electrical cabinets, preventing connection of the electrical equipment within the cabinet unless the cabinet door is closed. The preferred embodiment is particularly useful for circuit breakers within arc resistant cabinets.

Figure 1:
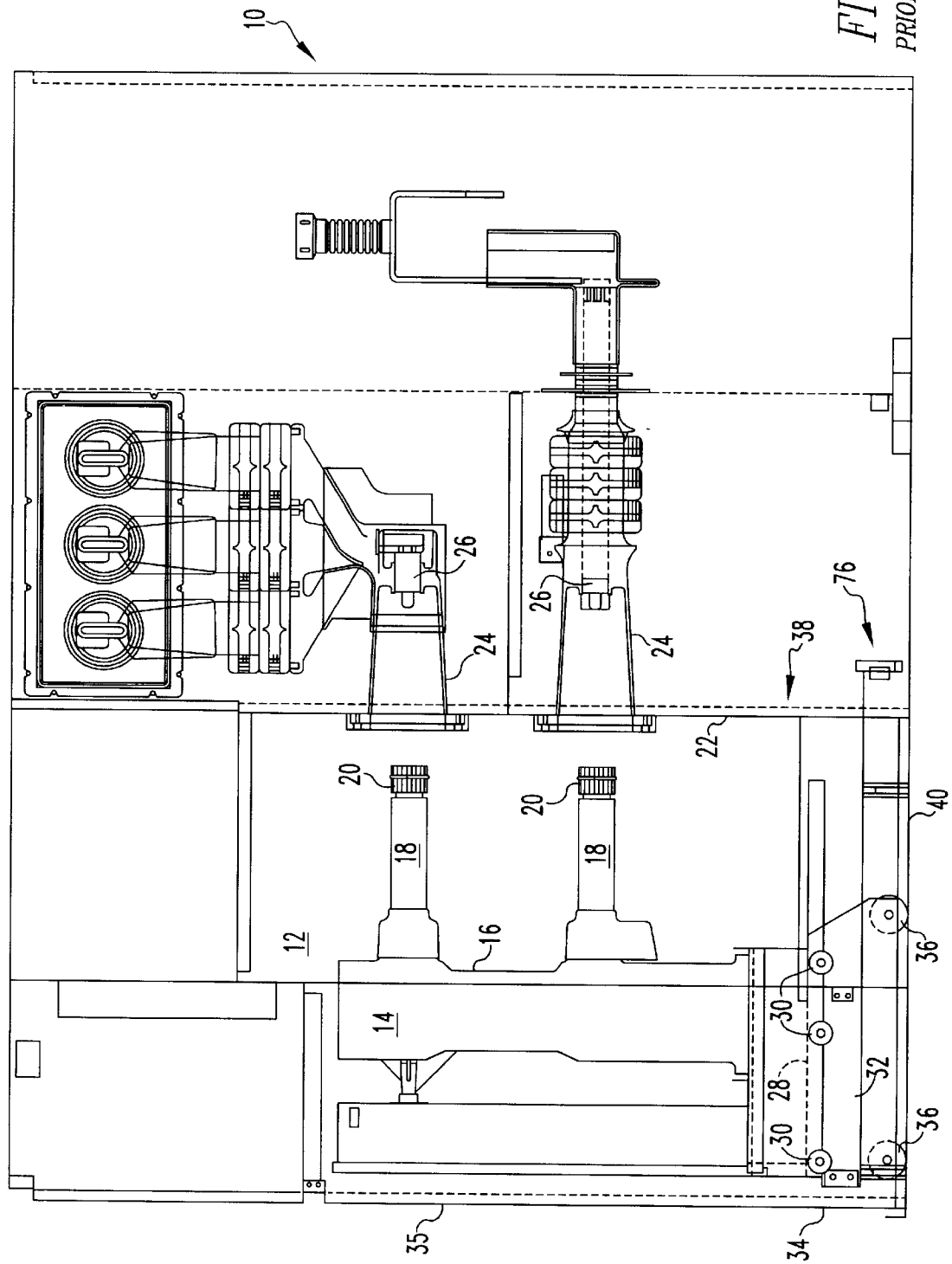
FIG. 1 is a side cross sectional view of a circuit breaker cabinet showing the circuit breaker in its forward, disengaged position.
Figure 2:
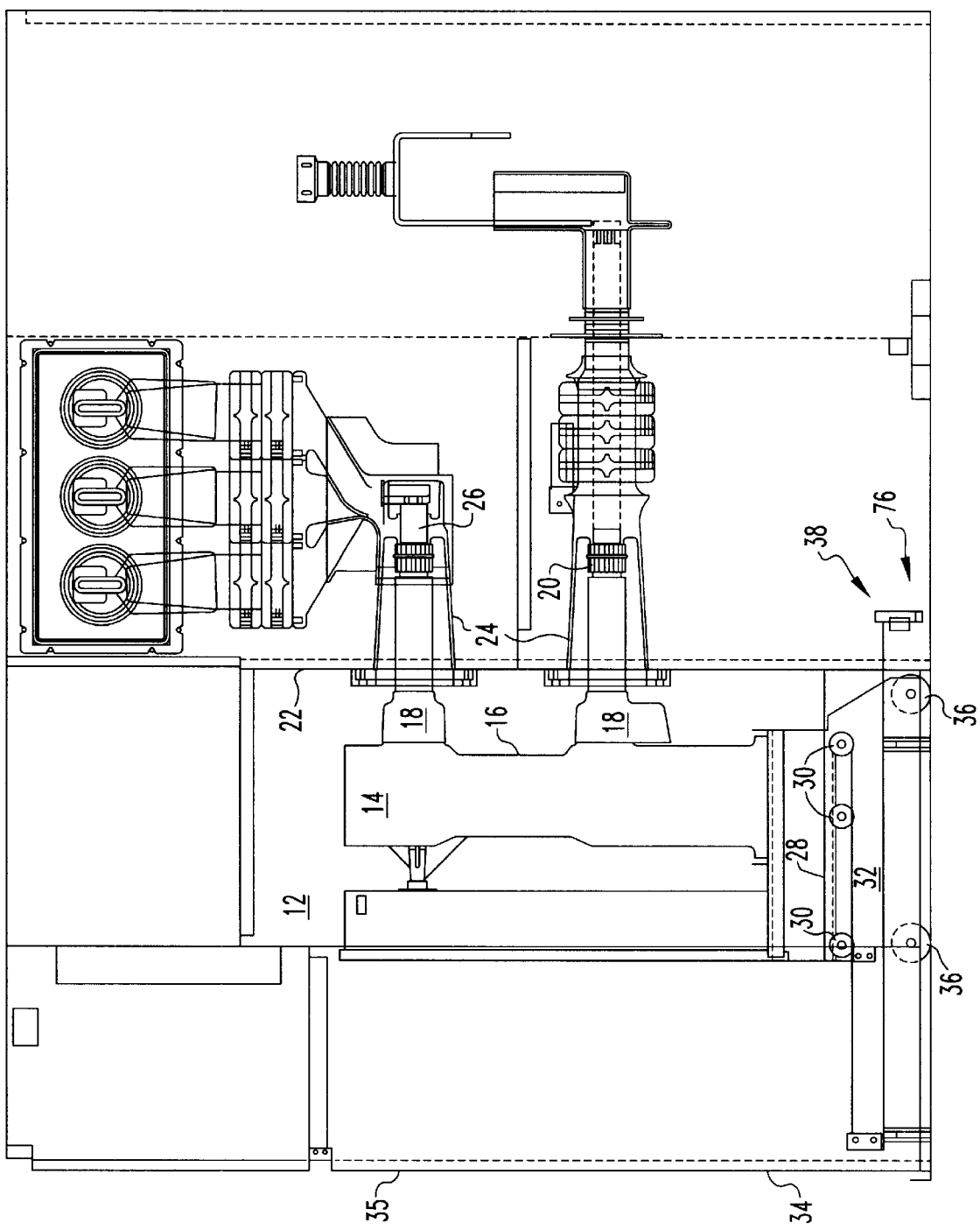
FIG. 2 is a side cross sectional view of a circuit breaker cabinet showing the circuit breaker in its rearward, engaged position.

An interlock of the present invention is best understood through and explanation of a conventional medium voltage circuit breaker. Referring to FIGS. 1 and 2, a switchgear assembly 10 is illustrated. The switchgear 10 includes cabinet 12, containing a circuit breaker 14. The back 16 of the circuit breaker 14 includes means for electrical connection with a circuit, which are preferably at least one pair of quick disconnects 18, with each quick disconnect 18 terminating with a plurality of contact fingers 20. The cabinet's rear wall 22 includes means for connecting to the means for electrical connection of the circuit breaker to a circuit, which preferably include a pair of channels 24, with each quick disconnect containing a primary contact or stab 26. Quick disconnects 18 and contact fingers 20 are dimensioned and configured so that, when the quick disconnects 18 are inserted into the channels 24, the contact fingers 20 are electrically connected to the primary contact 26. A typical medium voltage circuit breaker will include a combination of three pairs of quick disconnects 18 and three corresponding pairs of channels 24. The bottom 28 of circuit breaker 14 may include a plurality of rollers 30, dimensioned and configured to permit the circuit breaker to move along the rails 32, extending from the cabinet's rear 22 to the cabinet's front 34. The circuit breaker 14 may also rest on rollers 36, permitting the circuit breaker 14 to move within the cabinet 12.

Figure 3:
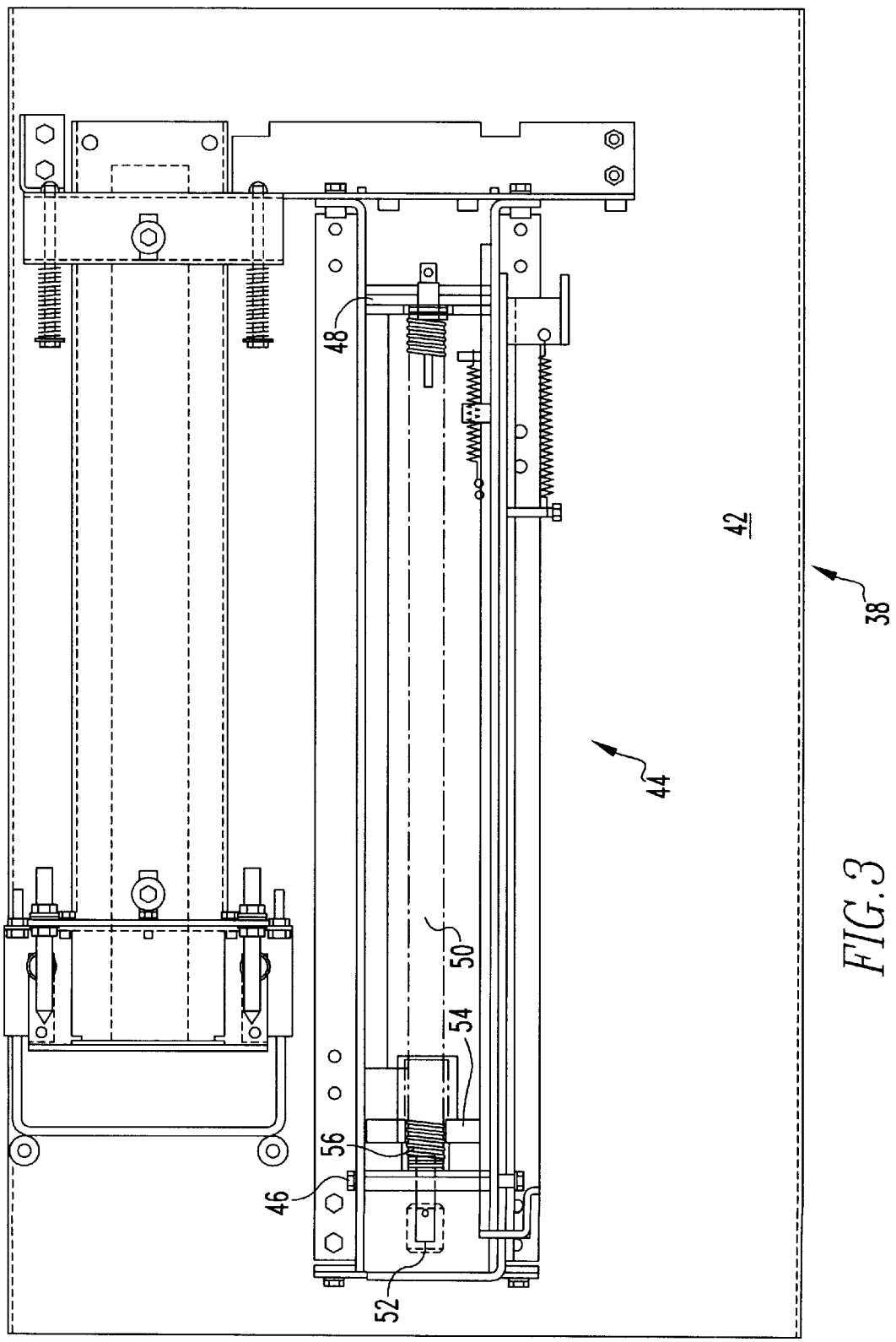
FIG. 3 is a top view of a levering in mechanism for a circuit breaker.
Figure 4:
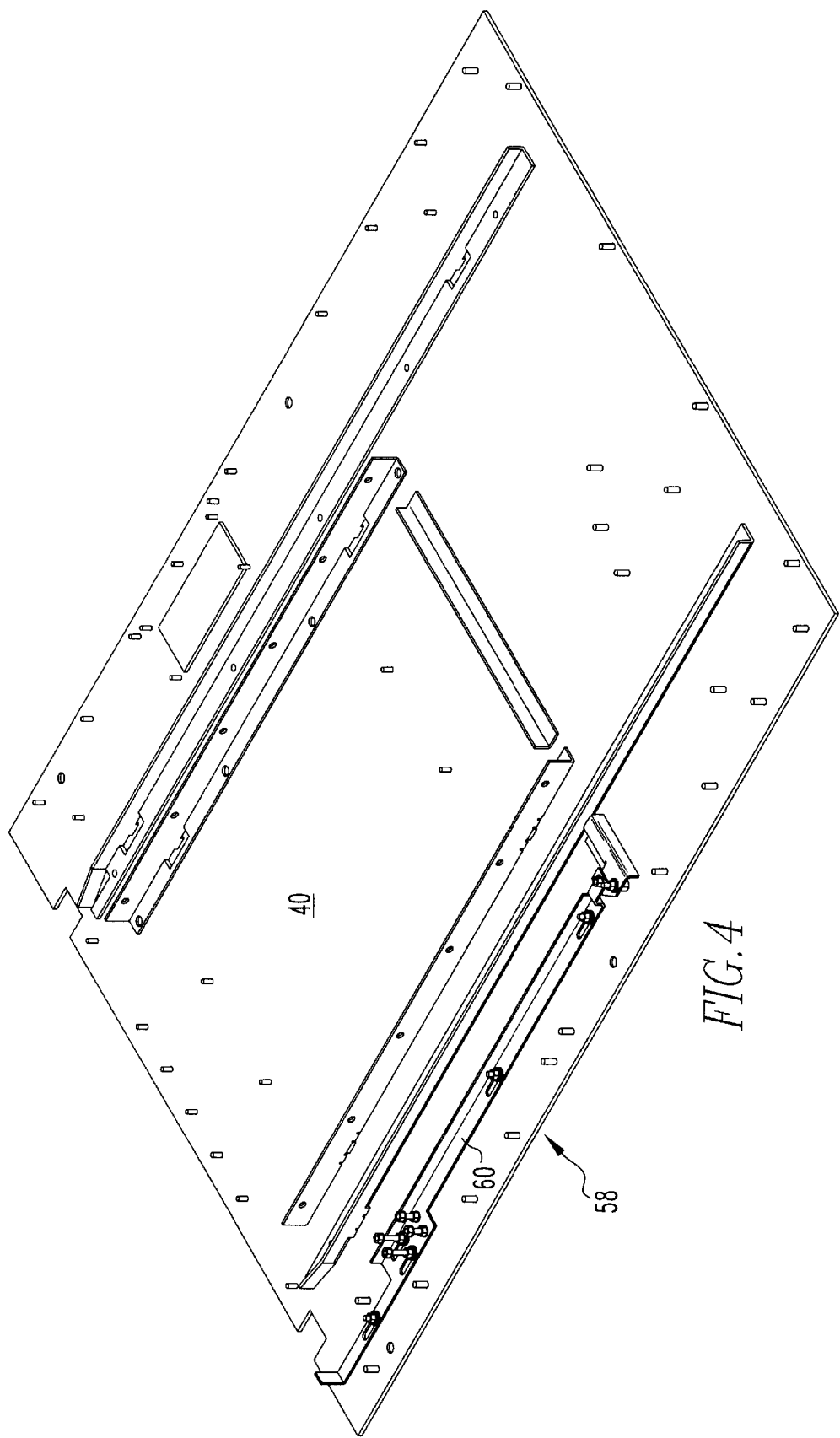
FIG. 4 is a top isometric view of a cabinet floor including an interlock of the present invention.

Referring to FIG. 3, the cabinet 12 also includes means for moving the circuit breaker 14 between a rearward position and a forward position, preferably including a levering in pan assembly 38 which is secured to the bottom 40 of the cabinet 12. The levering in pan assembly 38 includes a pan 42, upon which the levering in assembly 44 is mounted. The levering in assembly 44 includes a front bearing block 46, mounted to the front of pan 42, and a rear-bearing block 48, mounted to the rear of pan 42. A drive screw 50 extends between the front bearing block 46 and rear-bearing block 48, terminating in a tip 52, dimensioned and configured to engage a crank. The tip 52 will typically be a hex drive. A levering in block 54 is thread mounted on the drive screw 50, so that rotation of the drive screw 50 moves the levering in block 54 forward or rearward. The levering in block may also include forward stop 56.

In use, the circuit breaker 14 will typically be in the rearward, engaged position of FIG. 2, wherein the contact fingers 20 are electrically connected to the primary contacts 26. In this position, power may be supplied through the circuit breaker to the protected circuit. When servicing the circuit breaker is desired, power is disconnected by opening the circuit breaker (using either controls on the exterior of the cabinet or remotely), and a crank (not shown and well known in the art) is secured to the hex drive 52 of drive screw 50. The rotation of drive screw 50 moves levering in block 54 forward, thereby moving the circuit breaker 14 forward so that the quick disconnects 18 are brought out of engagement with the channels 24. The circuit breaker 14 is now completely isolated from electrical power, as illustrated in FIG. 1. In this position, the door may be opened and the circuit breaker may be serviced safely. When service is complete, the crank is again secured to the hex drive 52 of drive screw 50 so that drive screw 50 may be rotated in the opposite direction, thereby moving the levering block 54 and circuit breaker 14 rearward. The quick disconnects 18 are thereby brought into engagement with the channels 24, bringing the contact fingers 20 back into electrical contact with the primary contacts 26.

It becomes apparent from the above description that preventing the circuit breaker 14 from being moved rearward into its connected position unless the door 35 of the cabinet 12 is closed is desirable to prevent any possibility of injury to personnel servicing the circuit breaker 14. The interlock of the present invention accomplishes this purpose.

Referring to FIGS. 4–10, an interlock 58 of the present invention is illustrated. The interlock 58 includes a spring-biased brake bar 60, controlling a brake 62. The interlock 58 is preferably mounted on the floor 40 of the cabinet 12, with the brake 62 directly behind one of the rollers 30 or 36.

Figure 6:
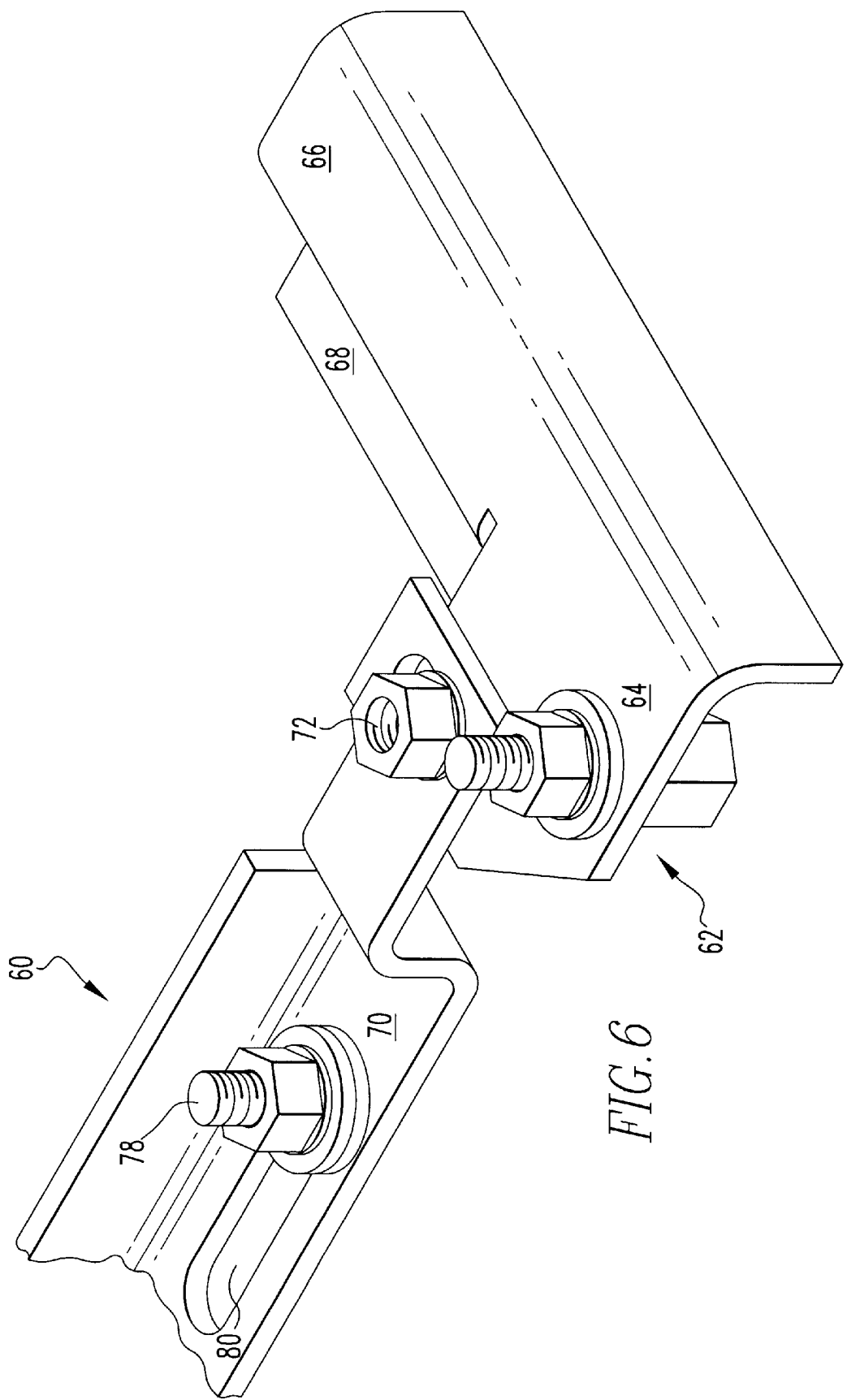
FIG. 6 is an isometric view of a brake for an interlock according to the present invention, showing the brake in the locked position.
Figure 9:
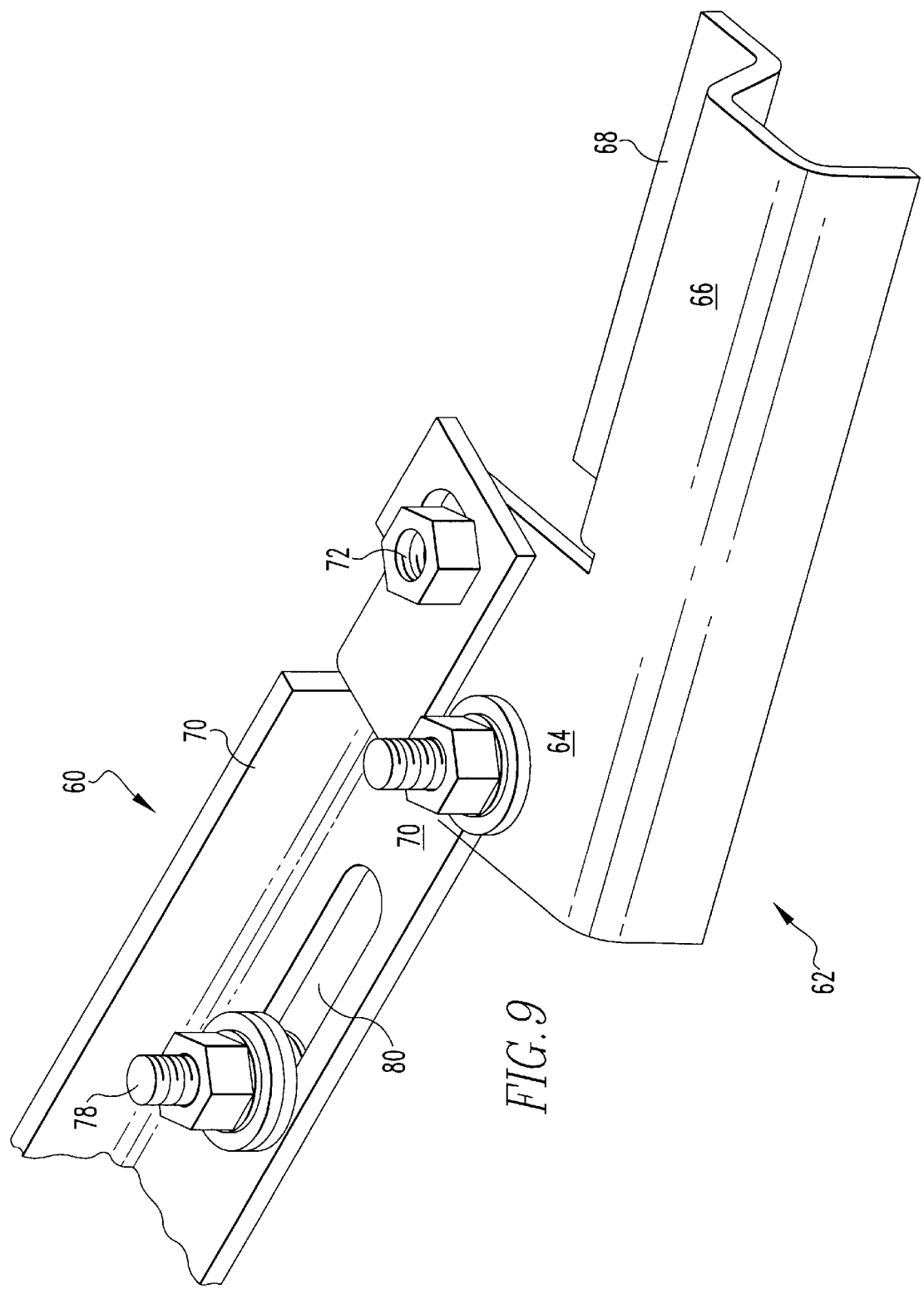
FIG. 9 is an isometric view of a brake for an interlock of the present invention showing the brake in the unlocked position.

The brake 62 is best illustrated in FIGS. 6 and 9. The brake is dimensioned and configured to block the rotation of a roller 30 or 36 when the brake is in its engaged position. The brake 62 preferably includes a first end 64, pivotally secured to the floor 40 of cabinet 12. The brake's second end 66 preferably includes a surface 68, dimensioned and configure to be wedged underneath the bottom of a roller 30 or 36, thereby preventing rotation of the roller 30 or 36. The brake 62 pivots between an engaged position (FIG. 6) and a disengaged position (FIG. 9).

Figure 5:
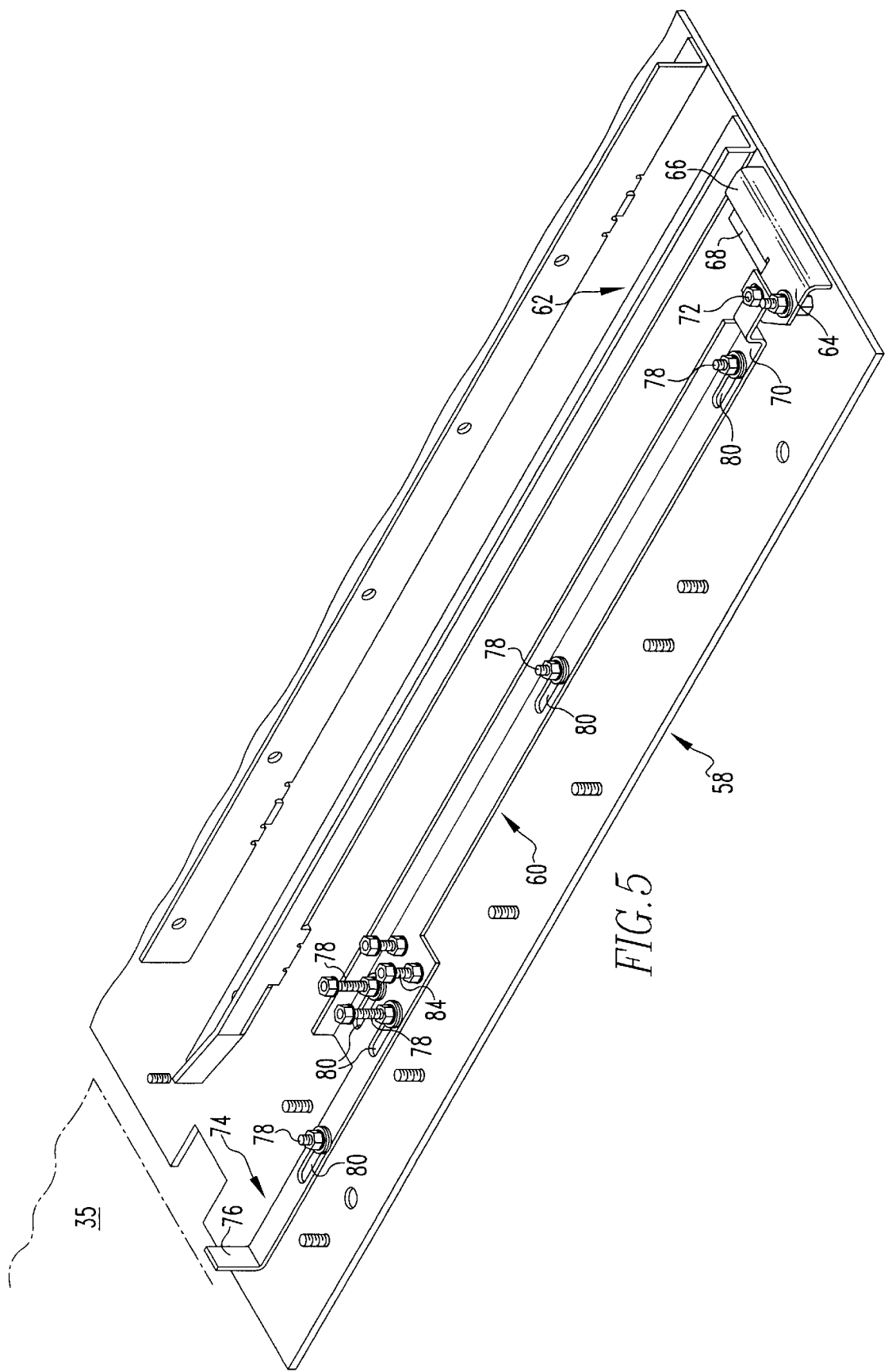
FIG. 5 is an isometric view of the interlock according to the present invention, showing the interlock in the locked position.
Figure 7:
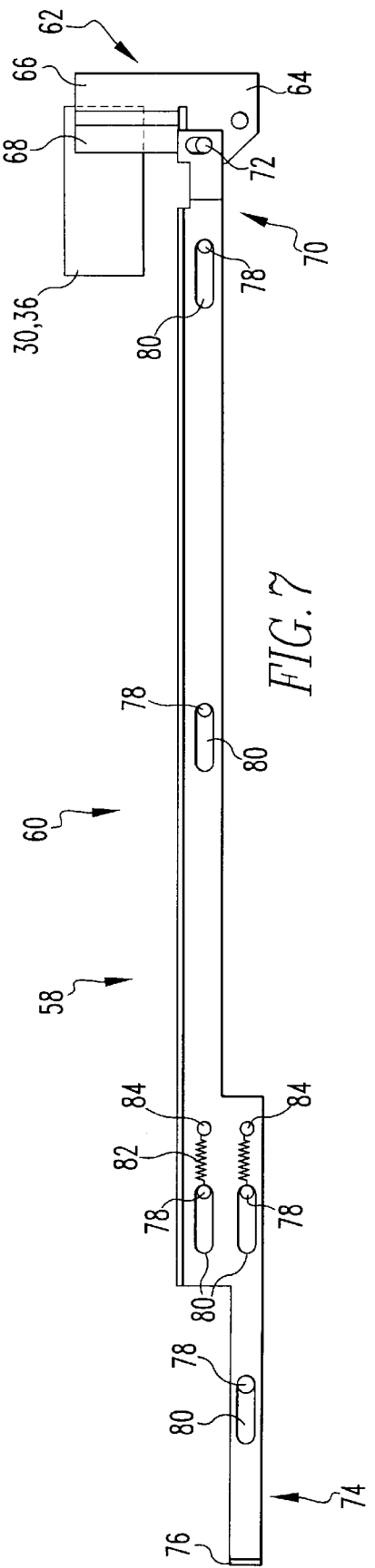
FIG. 7 is a top view of an interlock and circuit breaker wheel according to the present invention, showing the position of the brake bar and brake relative to the wheel in the locked position.
Figure 8:
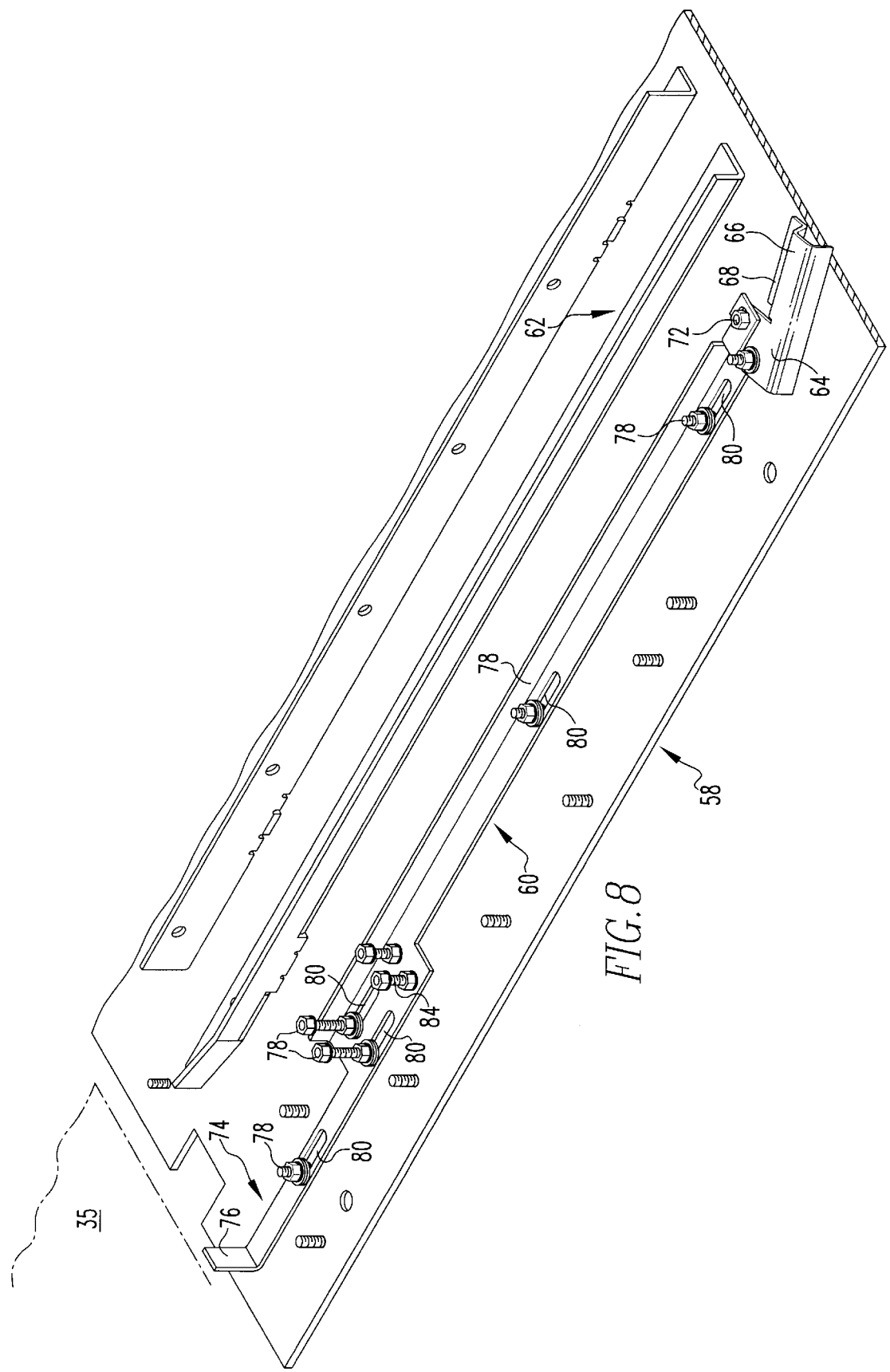
FIG. 8 is an isometric view of an interlock according to the present invention, showing the brake in the unlocked position.
Figure 10:
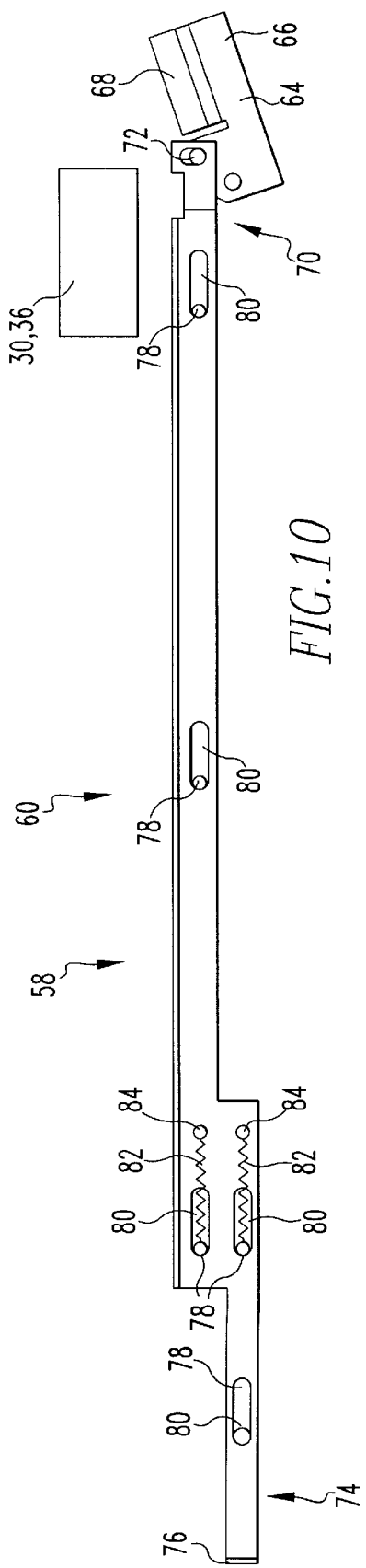
FIG. 10 is a top view of an interlock and circuit breaker wheel, showing the position of the brake bar, brake, and wheel with the interlock in the unlocked position.

The brake bar 60 is best illustrated in FIGS. 5 and 8. The brake bar 60 preferably includes a rear end 70, dimensioned and configured to control the movements of the brake 62 between its engaged and disengaged positions. The rear end 70 of brake bar 60 is preferably pivotally secured to the brake 62, at point 72, located between the brake's first end 64 and brake's second end 66. The brake's front end 74 is dimensioned and configured to abut the door 35 of the cabinet 12 when the door 35 is in its closed position. The brake bar's front end 74 may include a tab 76 perpendicular to the brake bar 60 for this purpose. The brake bar 60 moves between a forward position (FIG. 5) wherein the brake 62 is held in its engaged position, and a rearward position (FIG. 8), wherein the brake 62 is held in its disengaged position. Means for permitting the brake bar 60 to move between these two positions preferably includes the bolt 78, securing the brake bar 60 to the cabinet floor 40, passing through the slots 80 within the brake bar 60. Referring to FIGS. 7 and 10, the brake bar 60 is biased towards its forward position, preferably by the tension springs 82 connected between the bolts 80 secured to the floor 40, and the bolts 84 secured to the brake bar 60. Because the brake 62 is connected to the brake bar 60 at 72, the brake 62 is thereby biased into its engaged position.

When the circuit breaker 14 is in use, it will be in a position shown in FIG. 2. In this rearward, connected position, the door 35 will abut the tab 76 of the brake bar 60, thereby pushing the brake bar 60 towards its rearward position. The brake bar 60 will thereby hold the brake 62 in its disengaged position, illustrated in FIGS. 8–10.

When the circuit breaker 14 must be serviced, it is first moved from the rearward connected position of FIG. 2 to the forward disconnected position of FIG. 1. This is accomplished by opening the breaker, and then securing a crank to the hex drive 52 of the drive screw 50 as described above, so that the drive screw 50 can be rotate to move the levering block 54 and circuit breaker 14 to the forward position of FIG. 1 within the cabinet 12. At this point, the door 35 may safely be opened. Because the door 35 no longer abuts the tab 76 of the brake bar 60, the brake bar 60 will move forward under the bias of springs 82. The brake 62 will thereby move from the disengaged position of FIGS. 8–10 to the engaged position of FIGS. 5–7. In the engaged position, the surface 68 of the brake 62 fits between the roller 30 and rail 32, or alternatively between the roller 36 and cabinet floor 40, depending on the position of the brake 62 within the cabinet 12. The roller 30 or 36 is thereby prevented from moving rearward, thereby securing the circuit breaker 14 in its forward, disconnected position.

When service to the circuit breaker is complete, the door 35 is closed, thereby causing the door 35 to push rearward on the tab 76 of the brake bar 60. The brake bar 60 thereby moves the brake 62 from the engaged position of FIGS. 5–7 to the disengaged position of FIGS. 8–10. The rollers 30 and 36 are now free to move. The crank may then be secured to the hex drive 52 of the drive screw 50, so that the drive screw 50 can be rotated in the opposite direction, thereby moving the levering block 54 and circuit breaker 14 to the circuit breaker's rearward, connected position, illustrated in FIG. 2.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An interlock for a cabinet for electrical equipment, the electrical equipment having a plurality of rollers, the cabinet having a door moving between an open position and a closed position, said interlock comprising:
    a brake moving between an engaged position and a disengaged position, said brake being dimensioned and configured to engage one of the plurality of roller of the electrical equipment when said brake is in the engaged position;
    means for biasing said brake towards said engaged position; and
    means for moving said brake from said engaged position to said disengaged position when the door is in the closed position.

2. The interlock according to claim 1, wherein said means for moving said brake from said engaged position to said disengaged position include a brake bar pivotally secured to said brake, and being dimensioned and configured to abut the door when the door is in the closed position.

3. The interlock according to claim 2, wherein said means for biasing said brake towards said engaged position include means for biasing said brake bar towards said door.

4. The interlock according to claim 3, wherein said means for biasing said brake bar towards said door include at least one spring.

5. The interlock according to claim 1, wherein said brake is pivotally secured to a floor of said cabinet.

6. The interlock according to claim 1, wherein said brake is dimensioned and configured to be wedged underneath the bottom of a roller.

7. A cabinet for housing electrical equipment, the electrical equipment having a plurality of rollers, said cabinet comprising:
    a door;
    means for moving electrical equipment between a rearward, connected position and a forward, disconnected position; and
    an interlock, comprising:
        a brake moving between an engaged position and a disengaged position, said brake being dimensioned and configured to engage one of the plurality of rollers of the electrical equipment when said brake is in said engaged position;
        means for biasing said brake towards said engaged position; and
        means for moving said brake from said engaged position to said disengaged position when the door is in the closed position.

8. The cabinet according to claim 7, wherein said means for moving said brake from said engaged position to said disengaged position include a brake bar pivotally secured to said brake, and being dimensioned and configured to abut the door when the door is in the closed position.

9. The cabinet according to claim 8, wherein said means for biasing said brake towards said engaged position include means for biasing said brake bar towards said door.

10. The cabinet according to claim 9, wherein said means for biasing said brake bar towards said door include at least one spring.

11. The cabinet according to claim 7, wherein said means for moving electrical equipment between a rearward, connected position and a forward, disconnected position is a levering in assembly.

12. The cabinet according to claim 7, wherein said brake is pivotally secured to a floor of said cabinet.

13. The cabinet according to claim 7, wherein said brake is dimensioned and configured to be wedged underneath the bottom of a roller.

14. A circuit breaker assembly, comprising:
    a circuit breaker, comprising:
        means for electrical connection with a circuit; and
        said circuit breaker moving between a forward position and a rearward position; and
    a cabinet, comprising:
        a door;
        means for connecting to said means for electrical connection of said circuit breaker when said circuit breaker is in said rearward position;
        a levering in assembly having a threaded rod and a levering in block threaded to the threaded rod; and an interlock, comprising:
- a brake moving between an engaged position and a disengaged position, said brake being dimensioned and configured to engage a roller of electrical equipment when said brake is engaged;
- means for biasing said brake towards said engaged position; and
- means for moving said brake from said engaged position to said disengaged position when the door is in the closed position.

15. The circuit breaker assembly according to claim 14, wherein said means for moving said brake from said engaged position to said disengaged position include a brake bar pivotally secured to said brake, and being dimensioned and configured to abut the door when the door is in the closed position.

16. The circuit breaker assembly according to claim 15, wherein said means for biasing said brake towards said engaged position include means for biasing said brake bar towards said door.

17. The circuit breaker assembly according to claim 16, wherein said means for biasing said brake bar towards said door include at least one spring.

18. The circuit breaker according to claim 14, wherein said means for moving electrical equipment between a rearward, connected position and a forward, disconnected position is a levering in assembly.

19. The circuit breaker according to claim 14, wherein said brake is pivotally secured to a floor of said cabinet.

20. The circuit breaker according to claim 14, wherein said brake is dimensioned and configured to be wedged underneath the bottom of a roller.

* * * * *